(12) United States Patent
Morikawa et al.

(10) Patent No.: US 7,521,135 B2
(45) Date of Patent: Apr. 21, 2009

(54) RECORDING MEDIUM AND METHOD OF MAKING THE SAME

(75) Inventors: Takeshi Morikawa, Kawasaki (JP); Ken Tamanoi, Kawasaki (JP); Takuya Kamimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 608 days.

(21) Appl. No.: 10/808,236

(22) Filed: Mar. 24, 2004

(65) Prior Publication Data
US 2005/0068855 A1   Mar. 31, 2005

(30) Foreign Application Priority Data
Sep. 30, 2003   (JP)   ............... 2003-341862

(51) Int. Cl.
*G11B 5/66* (2006.01)
(52) U.S. Cl. .................. 428/824.1; 428/824.4
(58) Field of Classification Search ............ None
See application file for complete search history.

(56) References Cited

U.S. PATENT DOCUMENTS

| | | | |
|---|---|---|---|
| 6,177,175 B1 * | 1/2001 | Hashimoto | 428/141 |
| 6,538,960 B1 * | 3/2003 | Sabi et al. | 369/13.38 |
| 6,596,366 B2 * | 7/2003 | Ohno | 428/64.1 |
| 6,727,007 B2 * | 4/2004 | Kamimura et al. | 428/823.2 |
| 6,928,033 B2 * | 8/2005 | Matsumoto | 369/13.38 |
| 2002/0177011 A1 | 11/2002 | Matsumoto | |
| 2003/0113504 A1 | 6/2003 | Kamimura et al. | |

FOREIGN PATENT DOCUMENTS

| | | |
|---|---|---|
| JP | 2002-315287 | 10/2002 |
| JP | 2002-352485 | 12/2002 |
| JP | 2003-187506 | 7/2003 |
| JP | 2003-223713 | 8/2003 |
| JP | 2003-323749 | 11/2003 |

OTHER PUBLICATIONS

English machine translation of JP 08-227541, Yamaguchi et al., Japan, Sep. 1996.*

* cited by examiner

*Primary Examiner*—Holly Rickman
(74) *Attorney, Agent, or Firm*—Greer, Burns & Crain, Ltd.

(57) ABSTRACT

A recording medium includes a substrate, a recording layer provided with perpendicular magnetic anisotropy for recording of information, a foundation layer disposed between the substrate and the recording layer, an initial layer which is greater in surface tension than the foundation layer and held in contact with a recoding-layer-side surface of the foundation layer, and a functional layer held in contact with a recoding-layer-side surface of the initial layer.

8 Claims, 13 Drawing Sheets

| |
|---|
| Roughness Controlling Layer (Pt, 1nm) |
| Second Foundation Layer (SiN, 5nm) |
| Heat Sink Layer (AlSi, 30nm) |
| Initial Layer (Pt, 1nm) |
| First Foundation Layer (SiN, 2nm) |
| Substrate (Glass) |

| | APS (nm) | Ra (nm) | P−V (nm) |
|---|---|---|---|
| Sample A | 7.6 | 0.69 | 5.9 |
| Sample B | 15.2 | 0.72 | 6.3 |
| Sample C | 23.5 | 0.73 | 8.5 |
| Sample D | 34.7 | 0.98 | 9.5 |

FIG.9

| Roughness Controlling Layer (Pt, 1nm) |
|---|
| Second Foundation Layer (SiN, 5nm) |
| Heat Sink Layer (AlSi, 30nm) |
| Initial Layer (Pt, 1nm) |
| First Foundation Layer (SiN, 2nm) |
| Substrate (Glass) |

FIG.10

| Heat Sink Layer (AlSi, 30nm) |
|---|
| Initial Layer (Pt, 1nm) |
| First Foundation Layer (SiN, 2nm) |
| Substrate (Glass) |

FIG.18

| Protective Coat (Transparent Resin, 15 μm) |
| --- |
| Enhancement Layer (SiN, 35nm) |
| Recording Layer (Tb$_{22}$Fe$_{62}$Co$_{16}$, 50nm) |
| Roughness Controlling Layer (Pt, 1nm) |
| Second Foundation Layer (SiN, 5nm) |
| Heat Sink Layer (AlSi, 30nm) |
| Initial Layer (Pt, 1nm) |
| First Foundation Layer (SiN, 2nm) |
| Substrate (Glass) |

FIG.19

| Protective Coat (Transparent Resin, 15 μm) |
| --- |
| Enhancement Layer (SiN, 35nm) |
| Recording Layer (Tb$_{22}$Fe$_{62}$Co$_{16}$, 50nm) |
| Roughness Controlling Layer (Pt, 1nm) |
| Heat Sink Layer (AlSi, 30nm) |
| Substrate (Glass) |

FIG.20

| |
|---|
| Protective Coat (Transparent Resin, 15 $\mu$m) |
| Enhancement Layer (SiN, 35nm) |
| Reproducing Layer (Gd$_{27}$Fe$_{65}$Co$_8$, 20nm) |
| Intermediate Layer (Tb$_{22}$Fe$_{78}$, 15nm) |
| Recording Layer (Tb$_{22}$Fe$_{62}$Co$_{16}$, 70nm) |
| Roughness Controlling Layer (Pt, 1nm) |
| Second Foundation Layer (SiN, 5nm) |
| Heat Sink Layer (AlSi, 30nm) |
| Initial Layer (Pt, 1nm) |
| First Foundation Layer (SiN, 2nm) |
| Substrate (Glass) |

FIG.21

| |
|---|
| Protective Coat (Transparent Resin, 15 $\mu$m) |
| Enhancement Layer (SiN, 35nm) |
| Reproducing Layer (Gd$_{27}$Fe$_{65}$Co$_8$, 20nm) |
| Intermediate Layer (Tb$_{22}$Fe$_{78}$, 15nm) |
| Recording Layer (Tb$_{22}$Fe$_{62}$Co$_{16}$, 70nm) |
| Roughness Controlling Layer (Pt, 1nm) |
| Heat Sink Layer (AlSi, 30nm) |
| Substrate (Glass) |

RECORDING MEDIUM AND METHOD OF MAKING THE SAME

BACKGROUND OF THE INVENTION

1. Field of the Invention

The present invention relates to a recording medium including a recording layer provided with perpendicular magnetic anisotropy. The invention also relates to a method of making such a recording medium.

2. Description of the Related Art

A Magneto-optical recording medium and a perpendicular magnetic recording medium include a recording layer provided with perpendicular magnetic anisotropy. To serve as a rewritable storage, the magneto-optical recording medium utilizes various magnetic properties of the material so that it has a thermomagnetic recording function and a magneto-optical reproducing function. For data recording, the magneto-optical recording medium includes a perpendicular magnetic layer made of an amorphous alloy of a rare earth element and a transition metal. This layer has an easy magnetization axis extending perpendicularly to the surface of the layer. In such an arrangement, signals are recorded in the recording layer as the variation of the magnetic directions. The recording of data is performed by the combination of laser beam application to the recording layer (for causing temperature increase at the irradiated portion) and a magnetic field application to that portion. After signals are recorded, they can be read by a reading optical system based on the variation of the magnetic directions.

In the technical field of the magneto-optical recording medium, various reproducing techniques have been developed for reproducing signals recorded at a high density exceeding the limit on the resolution of a reading optical system. Examples of such reproducing techniques are MSR (magnetically induced super resolution), MAMMOS (magnetic amplifying magneto-optical system) and DWDD (domain wall displacement detection). A magneto-optical disk to be read by such a reproducing system includes a magnetic recording portion having a laminated structure comprising a recording layer and other magnetic layers. Examples of such a magneto-optical disk are disclosed in JP-A-2002-315287, JP-A-2002-3524.85 and JP-A-2003-187506.

To realize high recording density of a recording medium, enhancement of the reading resolution of the reading optical system is also effective in addition to the above-mentioned development of a new reproducing technique, which is based on the structure of the magnetic recording portion. The resolution of a reading optical system can be increased by shortening the wavelength of the laser beam for reproduction or by increasing the numerical aperture (NA) of the objective lens (lens facing the recording medium). In this connection, a blue laser (having a wavelength of 405 nm, which is shorter than the conventionally-used wavelength of 660 nm) has been put into practical use. As for the numerical aperture (NA), a lens having a numerical aperture of 0.85, which is larger than the conventionally-used numerical aperture of 0.55, is available.

However, since a lens having a larger numerical aperture has a shorter focal distance, it is difficult to use a lens having a large numerical aperture for a conventional optical system of a back illumination type. Specifically, a lens having a relatively long focal distance need be used for the optical system of a back illumination type, because laser beams are applied to a recording layer or a magnetic recording portion through a transparent substrate which is made relatively thick for ensuring mechanical strength.

Therefore, as an alternative of such an optical system of the back illumination type, there is an increasing demand for the practical use of an optical system of a front illumination type which can use a lens having a large numerical aperture. In the optical system of the front illumination type, laser beams are applied to the recording layer or the magnetic recording layer from the side opposite from the substrate, so that such a long focal distance as is necessary in the back illumination type is not required. The use of an optical system of the front illumination type is demanded also for the purpose of realizing a high recording density of a magneto-optical recording medium for the above-described MSR, MAMMOS and DWDD.

In the magneto-optical recording medium, the shorter the length of stable recording marks (magnetic domains) on the recording layer is, the higher the recording resolution is and hence the higher the recording density becomes. As to a magneto-optical recording medium for the MSR, MAMMOS and DWDD in particular, a recording layer having a high recording density is demanded for fully utilizing the high reproducing resolution.

In the technical field of the magnetic material, it is known that the size and stability of magnetic domains to be formed on the perpendicular magnetic film of an amorphous alloy of a rare earth element and a transition metal are influenced by protrusions and valleys formed on the underlying surface on which the magnetic film is laminated. Specifically, small and stable magnetic domains can be formed on an underlying surface in which protrusions and valleys provide an appropriate roughness and are arranged at a small pitch.

The domain walls in the magnetic structure of the amorphous perpendicular recording film are fixed (pinning) due to the protrusions and valleys on the surface for laminating the magnetic film. The smaller the protrusion/valley pitch is, the smaller the pinning unit (magnetic cluster) is. Further, the pinning force acting on the domain walls increases as the surface roughness becomes large. When the pinning unit is small and the pinning force is large, small recording marks (magnetic domains) can be stably formed on the recording layer, which leads to enhancement of the recording resolution and reduction of recording noise (medium noise). Therefore, for providing a minute magnetic structure in the recording layer of an amorphous perpendicular magnetic film, the recording layer is of ten laminated on a foundation layer having an obverse surface formed with minute protrusions and valleys.

A perpendicular magnetic recording medium is a magnetic recording medium having a recording layer made of a perpendicular magnetic film. The recording layer may often be made of an amorphous alloy of a rare earth element and a transition metal. Signals are recorded in the recording layer as variation of the magnetic direction. The recording in the magnetic recording medium is performed by the application of a magnetic field by a recording head (electromagnetic coil). The recorded signals are read by a predetermined reading head as variation of the magnetic direction. Such a magnetic recording medium is disclosed in JP-A-2003-223713, for example.

In the perpendicular magnetic recording medium again, the recording layer is often laminated on a foundation layer having an obverse surface formed with minute protrusions and valleys for providing a minute magnetic structure in the recording layer.

A relatively thick layer having a required function is often provided between the substrate and the recording layer of a front illumination type magneto-optical recording medium or of a magnetic recording medium. For instance, in the magneto-optical recording medium, a heat sink layer, a non-magnetic layer or a recording magnetic field reducing layer may be provided between the substrate and the recording layer. In the magnetic recording medium, on the other hand, a soft magnetic layer or anon-magnetic layer may be provided.

However, these functional layers have a thickness of several ten or hundred nanometers for performing their required function. Due to this thickness, the material-growing-side surface of the functional layer, i.e. the surface on the recording layer side can be irregular, i.e., formed with protrusions and hollows which are haphazardly located. Therefore, when the foundation layer (upon which the recording layer is formed) is laminated on the functional layer, the surface of the foundation layer, on the recording layer side, is also formed with nonuniform protrusions and valleys. Such nonuniformity on the foundation layer causes nonuniformity in the pinning force and pinning units of the domain walls in the recording layer, which makes the magnetic structure of the recording layer significantly disorganized.

In the prior art structure, as described above, a uniform and minutely-pitched magnetic structure cannot be provided in the recording layer of a magneto-optical recording medium of a front illumination type nor a perpendicular magnetic recording medium. Thus, the enhancement of recording resolution and the reduction of recording noise cannot be sufficiently performed by the prior art structure, so that a high recording density cannot be achieved.

SUMMARY OF THE INVENTION

An object of the present invention, which is conceived under the circumstances described above, is to provide a recording medium which includes a recording layer having a perpendicular magnetic anisotropy and which can realize a high recording density. The invention also relates to a method of making such a recording medium.

According to a first aspect of the present invention, there is provided a recording medium. The recording medium includes a laminated structure which comprises a substrate, a recording layer having perpendicular magnetic anisotropy to serve to record information, a foundation layer located between the substrate and the recording layer, an initial layer which is greater in surface tension than the foundation layer and arranged on a recording-layer-side surface of the foundation layer, and a functional layer arranged on a recording-layer-side surface of the initial layer. The initial layer is formed by growing a suitable material on the foundation layer. The functional layer is formed by growing a suitable material on the initial layer. The recording medium may be structured as a magneto-optical recording medium or perpendicular magnetic recording medium of a front illumination type.

The recording medium having such a structure is suitable for realizing a high recording density. Since the initial layer is formed on the foundation layer which is smaller in surface tension than the initial layer, minutely-pitched protrusions and valleys are formed in the growing-side surface of the initial layer. Specifically, in the initial stage in the formation of the initial layer, the material of the initial layer develops in the form of a number of separate lands ("island growth") due to the difference of surface tension from the foundation layer. The protrusions and valleys formed by such island growth influence the surface configuration of the initial layer, which is formed to have a predetermined thickness. The degree of minuteness can be adjusted by selecting the materials of the initial layer and the foundation layer and adjusting the film thickness of the initial layer. Since the functional layer is formed by material growth on such protrusions and valleys, the functional layer is also formed with minutely-pitched and uniformly-distributed protrusions and valleys on its growing-side surface, even when the resultant functional layer has a rather great thickness on the order of several hundreds nanometers. The degree of minuteness and uniformity is considerably higher than when the functional layer would be formed directly on the substrate. When the recording layer is formed on such a functional layer directly or via a sufficiently thin layer, due to the protrusions and valleys on the surface of the functional layer, sufficiently large and uniform pinning forces are exerted at minute pitches to the domain walls of the domain structure of the recording layer. As a result, minute and stable pinning units are formed uniformly on the recording layer. Therefore, the magneto-optical recording medium can realize a high recording resolution while suppressing the recording noise (medium noise). Thus, the magneto-optical recording medium structured as a magneto-optical recording medium or a perpendicular magnetic recording medium can enhance the recording density.

According to a second aspect of the present invention, another recording medium is provided. The recording medium includes a laminated structure which comprises a substrate, a recording layer having perpendicular magnetic anisotropy to serve to record information, a first or primary foundation layer located between the substrate and the recording layer, an initial layer which is greater in surface tension than the first foundation layer and arranged on a recording-layer-side surface of the first foundation layer, a functional layer arranged on a recording-layer-side surface of the initial layer, a second foundation layer arranged on a recording-layer-side surface of the functional layer, and a protrusion/valley controlling layer which is greater in surface tension than the second foundation layer and interposed between the second foundation layer and the recording layer. The initial layer is formed by growing a predetermined material on the first foundation layer. The functional layer is formed by growing a predetermined material on the initial layer. The protrusion/valley controlling layer is formed by growing a predetermined material on the second foundation layer.

The recording medium having such a structure is suitable for realizing a high recording density. Since the initial layer according to the second aspect is formed on the first foundation layer having a smaller surface tension, minute protrusions and valleys are formed in the growing-side surface of the initial layer, as in the recording medium of the first aspect mentioned above. Specifically, in the initial stage in the formation of the initial layer, the material of the initial layer develops by island growth due to the difference of surface tension from the foundation layer. The minutely-pitched protrusions and valleys formed by such island growth influence the surface configuration of the initial layer formed to have a predetermined thickness. The degree of minuteness can be adjusted by selecting the materials of the initial layer and the first foundation layer and adjusting the film thickness of the initial layer. Since the functional layer is formed by material growth on such protrusions and valleys, the functional layer also includes minute and uniform protrusions and valleys on its growing-side surface even when it is formed into a rather great thickness on the order of several hundreds nanometers. The degree of minuteness and uniformity is considerably higher than when the functional layer would be formed directly on the substrate. Since the second foundation layer is formed directly on such a functional layer, the second foundation layer also includes minute and uniform protrusions and valleys on its growing-side surface. Since the protrusion/ valley controlling layer is formed on the second foundation layer having a smaller surface tension, the protrusion/valley controlling layer also includes, on its growing-side surface, protrusions and valleys which are more minute and uniform than those of the second foundation layer. Specifically, in the initial stage in the formation of the protrusion/valley controlling layer, the material of the protrusion/valley controlling layer develops by island growth while restricting its contact area with the second foundation layer due to the difference of surface tension from the second foundation layer. The minute protrusions and valleys formed by such island growth influence the surface configuration of the protrusion/valley controlling layer formed to have a predetermined thickness. When the recording layer is formed directly on such a protrusion/valley controlling layer, due to the protrusions and valleys on the surface of the protrusion/valley controlling layer, a sufficiently large, considerably minute and uniform pinning force is exerted to the domain walls of the domain structure of the recording layer. As a result, minutely-pitched pinning units are formed uniformly and stably on the recording layer. Therefore, the magneto-optical recording medium can realize a high recording resolution while suppressing the recording noise (medium noise).

Preferably, in the recording mediums of the first aspect and the second aspect, the functional layer is a heat sink layer, a non-magnetic layer, a recording magnetic field reducing layer or a soft magnetic layer. The provision of such a layer as the functional layer enhances the performance of the recording medium as a magneto-optical recording medium or a magnetic recording medium.

Preferably, the functional layer has a thickness of no less than 20 nm. Such a thickness is preferable in order that the functional layer can properly function as a heat sink layer, a non-magnetic layer, a recording magnetic field reducing layer or a soft magnetic layer.

Preferably, in the recording medium of the second aspect, the second foundation layer is smaller in surface tension than the functional layer. Such a condition is preferable in order that a sufficient difference of surface tension can be provided between the second foundation layer and the protrusion/valley controlling layer.

Preferably, in the recording medium of the second aspect, the protrusion/valley controlling layer has a recording-layer-side surface having a surface roughness Ra of 0.5-0.85 nm. Preferably, the protrusion/valley controlling layer has a recording-layer-side surface provided with protrusions and valleys, and the protrusions have an average diameter of 5-20 nm. Preferably, the maximum height difference of the protrusions and valleys is 3-10 nm. These conditions are preferable in order that the protrusions and valleys on the surface of the protrusion/valley controlling layer properly serve as pinning sites.

Preferably, the recording medium of the first aspect and the second aspect is a magneto-optical recording medium having a laminated structure including the recording layer for realizing MSR, MAMMOS or DWDD. The present invention is particularly advantageous when it is applied to a magneto-optical recording medium of a MSR type, MAMMOS type or a DWDD type capable of providing a high reproducing resolution.

According to a third aspect of the present invention, there is provided a method of making a recording medium. The method includes the steps of forming a foundation layer on a substrate, forming a protrusion/valley controlling layer on the foundation layer by island growth of a material which is greater in surface tension than the foundation layer, forming a functional layer on the protrusion/valley controlling layer, and forming a recording layer to serve to record information above the functional layer. The substrate, which serves as a base for forming a foundation layer thereon, may be a single plate made of a resin or may comprise a base plate and a dielectric layer laminated thereon. This applies to the structure according to the fourth aspect. The recording layer may be laminated on the functional layer directly or via one or more layers.

According to a fourth aspect of the present invention, another method of making a recording medium is provided. The method comprises the steps of forming a first foundation layer on a substrate, forming an initial layer on the first foundation layer by island growth of a material which is greater in surface tension than the first foundation layer, forming a functional layer on the initial layer, forming a second foundation layer which is smaller in surface tension than the functional layer on the functional layer, forming a protrusion/valley controlling layer on the second foundation layer by island growth of a material which is greater in surface tension than the second foundation layer, and forming, on the protrusion/valley controlling layer, a recording layer to serve to record information. With this method, the recording medium according to the second aspect can be manufactured properly.

In the methods of the third aspect and the fourth aspect, the functional layer is preferably a heat sink layer, a non-magnetic layer, a recording magnetic field reducing layer or a soft magnetic layer. Preferably, the functional layer is formed to have a thickness of no less than 20 nm.

BRIEF DESCRIPTION OF THE DRAWINGS

FIG. 9 illustrates the laminated structure of a sample A;

FIG. 10 illustrates the laminated structure of a sample B;

FIG. 18 illustrates the laminated structure of the magneto-optical recording medium of Example 1;

FIG. 19 illustrates the laminated structure of the magneto-optical recording medium of Comparative Example 1;

FIG. 20 illustrates the laminated structure of the magneto-optical recording medium of Example 2;

FIG. 21 illustrates the laminated structure of the magneto-optical recording medium of Comparative Example 2;

DETAILED DESCRIPTION OF THE PREFERRED EMBODIMENTS

Figure 1:
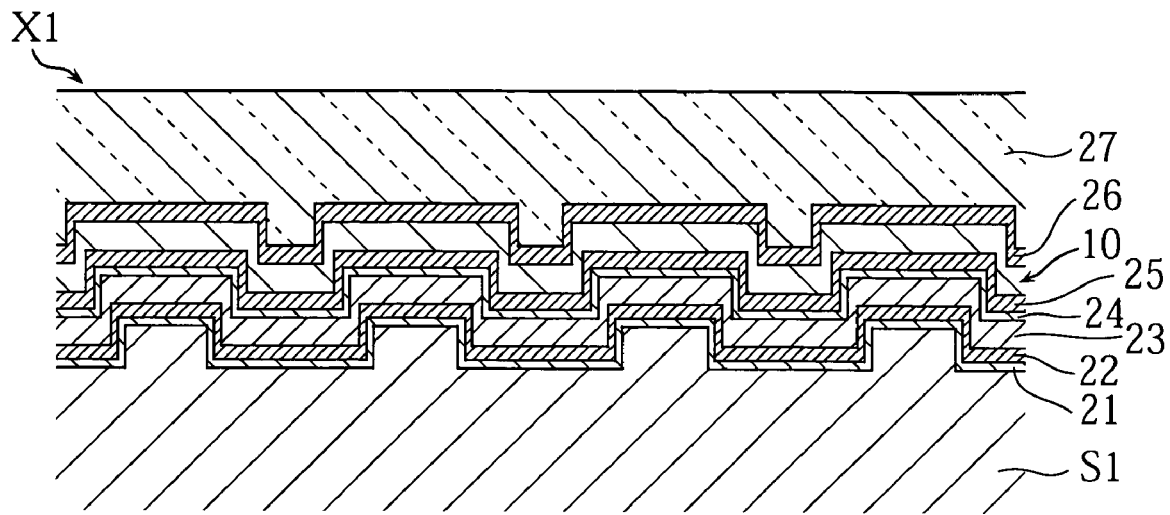
FIG. 1 is a sectional view illustrating part of a magneto-optical recording medium according to a first embodiment of the present invention.
Figure 2:
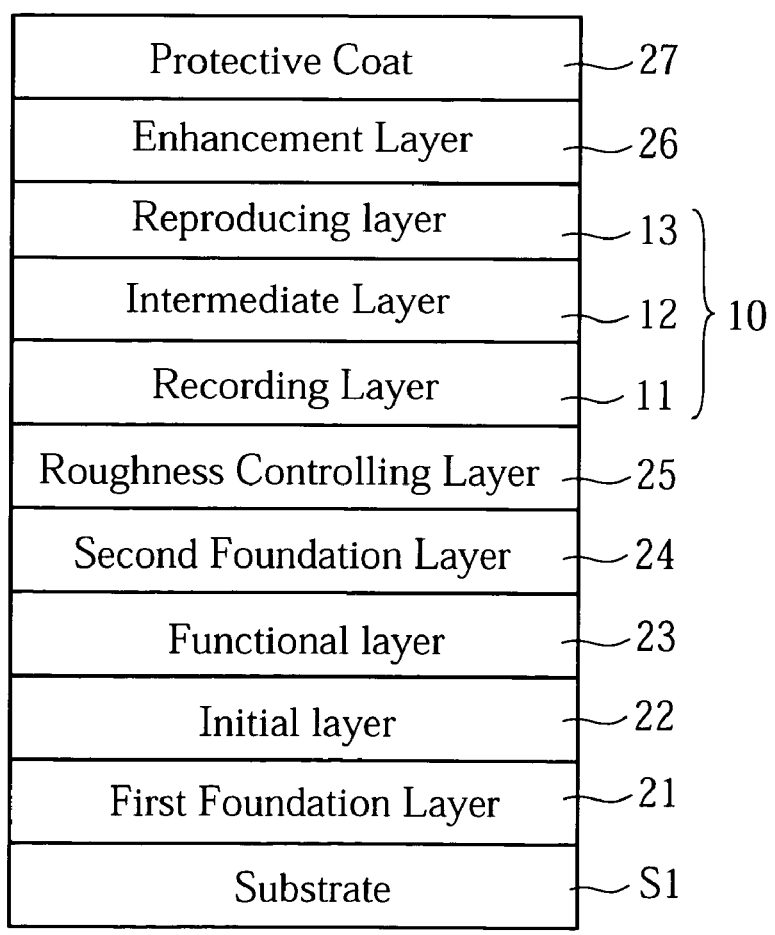
FIG. 2 illustrates the laminated structure of the magneto-optical recording medium shown in FIG. 1.

FIGS. 1 and 2 illustrate a magneto-optical recording medium X1 according to a first embodiment of the present invention. FIG. 1 is a sectional view schematically showing part of the magneto-optical recording medium X1, whereas FIG. 2 illustrates the laminated structure of the magneto-optical recording medium X1. The magneto-optical recording medium X1, which is structured as a magneto-optical disk of a front illumination type, includes a substrate S1, a first foundation layer 21, an initial layer 22, a functional layer 23, a second foundation layer 24, a roughness controlling layer (protrusion/valley controlling layer) 25, a magnetic recording portion 10, an enhancement layer 26 and a protective coat 27. The laminated structure from the first foundation layer 21 to the protective coat 27 is provided on one or both surfaces of the substrate S1.

The substrate 1 ensures the rigidity of the magneto-optical recording disk X1 and has a surface formed with a spiral pre-groove or concentric pre-grooves. The land/groove structure of the magneto-optical disk is formed based on configuration of the pre-grooved surface of the disk X1. The substrate S1 may be made of polycarbonate (PC) resin, polymethylmethacrylate (PMMA) resin, epoxy resin or polyolefin resin.

As shown in FIG. 2, the magnetic recording portion 10 has a laminated structure comprising a recording layer 11, an intermediate layer 12 and a reproducing layer 13 for allowing reproduction by magnetic domain expansion read-out (e.g. DWDD or MAMMOS). Each of the layers is a perpendicular magnetic film made of an amorphous alloy of a rare earth element and a transition metal. As the rare earth element, use may be made of Tb, Gd, Dy or Nd, for example. As the transition metal, use may be made of Fe or Co, for example. The magnetic recording portion 10 at the lands and/or the grooves of the land/groove structure constitutes the information track of the recording disk X1.

The recording layer 11, which functions to record information, has a domain wall coercivity which is greater than that of the reproducing layer 13. For example, the recording layer 11 may be made of TbFeCo, DyFeCo or TbDyFeCo having a predetermined composition. The recording layer 11 may have a thickness of 5.0-150 nm, for example.

The intermediate layer 12 functions to couple the recording layer 11 with the reproducing layer 13 or block the coupling between recording layer 11 and the reproducing layer 13 selectively. The intermediate layer 12 has a Curie temperature which is lower than those of the recording layer 11 and the reproducing layer 13. Specifically, at a temperature below the Curie temperature, the intermediate layer 12 forms exchange coupling with the recording layer 11 as well as with the reproducing layer 13, thereby coupling the recording layer 11 with the reproducing layer 13 through the exchange coupling.

On the other hand, at a temperature no less than the Curie temperature, the intermediate layer 12 loses spontaneous magnetization to cancel its exchange coupling with the recording layer 11 and with the reproducing layer 13, whereby the coupling between the recording layer 11 and the reproducing layer 13 through the exchange coupling is eliminated. The Curie temperature of the intermediate layer 12 may be 100-150° C., for example. The intermediate layer 12 may be made of TbFe or TbFeCo having a predetermined composition. The thickness of the intermediate layer 12 may be 5-20 nm.

The reproducing layer 13, utilized for reproduction accompanying domain wall displacement and magnetic domain expansion, has a domain wall coercivity which is smaller than that of the recording layer 11. The reproducing layer 13 may be made of GdFeCo, GdTbFeCo, GdDyFeCo or GdTbDyFeCo, for example. The reproducing layer 13 may have a thickness of 10-30 nm, for example.

The first foundation layer 21, which serves as a base for forming the initial layer 22 thereon, has a surface tension which is smaller than that of the initial layer 22. The first foundation layer 21 may be made of a dielectric material such as SiN, $SiO_2$, $YSiO_2$, $ZnSiO_2$, AlO or AlN, for example. The first foundation layer 21 may have a thickness of 2-10 nm, for example.

The initial layer 22 serves to control the protrusions and valleys on a material-growing-side surface of the functional layer 23 formed thereon. Preferably, the initial layer 22 is made of a material having a surface tension greater than that of the first foundation layer 21. Preferably, the difference of surface tension between the initial layer 22 and the first foundation layer 21 is no less than 1000 mN/m. As the material of the initial layer 22, use may be made of a single-element metal selected from the group consisting of Pt, Au, Pd, Ru and Co or an alloy containing a metal selected from the group as long as it has a surface tension greater than that of the first foundation layer 21. The initial layer 22 may have a thickness of 0.1-5 nm, for example. The surface of the initial layer 22 on the functional layer side (i.e. on the recording layer side) has a surface roughness Ra of 0.3-0.6 nm, for example. The protrusions (growing particles) in the protrusion/valley configuration may have an average diameter (average particle size) of 5-10 nm, and a maximum height difference (P–V) in the protrusion/valley configuration may be 3-5 nm.

The functional layer 23 is a portion for enhancing the performance of the recording medium. Specifically, the functional layer 23 may be a heat sink layer, a non-magnetic layer or a recording magnetic field reducing layer. The heat sink layer functions to effectively dissipate heat generated at the magnetic recording portion 10 when laser beams are applied. The non-magnetic layer functions to adjust thermal distribution when laser beams are applied. The recording magnetic field reducing layer functions to reduce the magnetic field necessary for recording. When the functional layer 23 is a heat sink layer, the layer 23 may be made of a highly heat conductive material such as Ag, Ag alloy (e.g. AgPdCuSi or AgPdCu), Al alloy (e.g. AlTi or AlCr), Au or Pt and may have a thickness of 10-60 nm, for example. When the functional layer 23 is a non-magnetic layer, the layer 23 may be made of an element selected from the group consisting of Ti, W and Si or an alloy containing an element selected from the group and may have a thickness of 10-60 nm, for example. When the functional layer 23 is a recording magnetic field reducing layer, the layer 23 may be made of GdFeCo, GdFe or GdCo and may have a thickness of 5-60 nm, for example.

The second foundation layer 24 serves as a base for forming the roughness controlling layer 25 thereon and has a surface tension which is smaller than that of the roughness controlling layer 22. Preferably, the surface tension of the second foundation layer 24 is smaller than that of the functional layer 23. The second foundation layer 24 may be made of a dielectric material such as SiN, $SiO_2$, $YSiO_2$, $ZnSiO_2$, AlO or AlN, for example. The second foundation layer 24 may have a thickness of 2-10 nm, for example.

The roughness controlling layer 25 exerts a pinning force to domain walls of the domain structure of the recording layer 11 laminated thereon, thereby controlling the domain structure. The roughness controlling layer 25 is made of a material having a surface tension which is greater than that of the second foundation layer 24. Preferably, the difference of surface tension between the roughness controlling layer 25 and the second foundation layer 24 is no less than 1000 mN/m. As the material of the roughness controlling layer 25, use may be made of a single-element metal selected from the group consisting of Pt, Au, Pd, Ru and Co or an alloy containing a metal selected from the group as long as it has a surface tension greater than that of the second foundation layer 24. The roughness controlling layer 25 may have a thickness of 0.1-5 nm, for example. The surface of the roughness controlling layer 25 on the recording layer side has a surface roughness Ra of 0.5-0.85 nm, for example. The protrusions (growing particles) in the protrusion/valley configuration may have an average diameter (average particle size) of 5-20 nm, and a maximum height difference (P–V) in the protrusion/valley configuration may be 3-10 nm.

The enhancement layer 26 functions to apparently increase the Kerr rotation angle of a reflected light from the reproducing layer 13. The enhancement layer 26 may be made of SiN, $SiO_2$, $ZnS-SiO_2$, AlN or $Al_2O_3$ and may have a thickness of 20-90 nm, for example.

The protective coat 27 is made of a resin capable of sufficiently transmitting laser beams for recording data and reading data relative to the magneto-optical recording medium X1 and may have a thickness of 10-40 μm, for example. The protective coat 27 may be made of an ultraviolet curing resin, for example.

FIGS. 3 and 4 illustrate process steps for making the magneto-optical recording medium X1. First, as shown in FIG. 3A, for making the magneto-optical recording medium X1, a first foundation layer 21 is formed on a substrate S1 by sputtering.

Figure 3A:
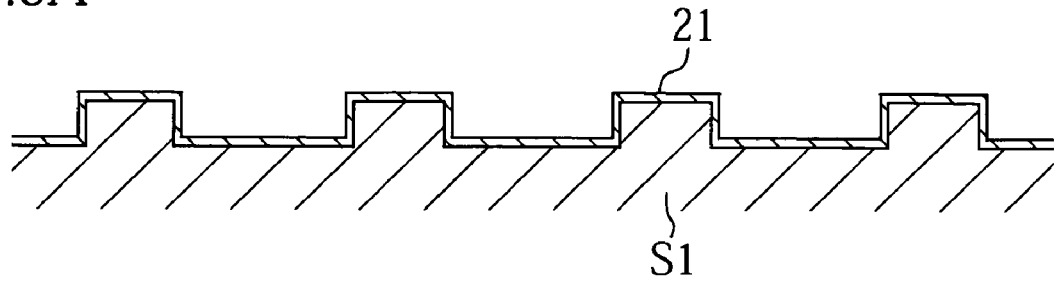
FIGS. 3A-3D illustrate part of process steps for making the magneto-optical recording medium shown in FIG. 1.
Figure 3B:
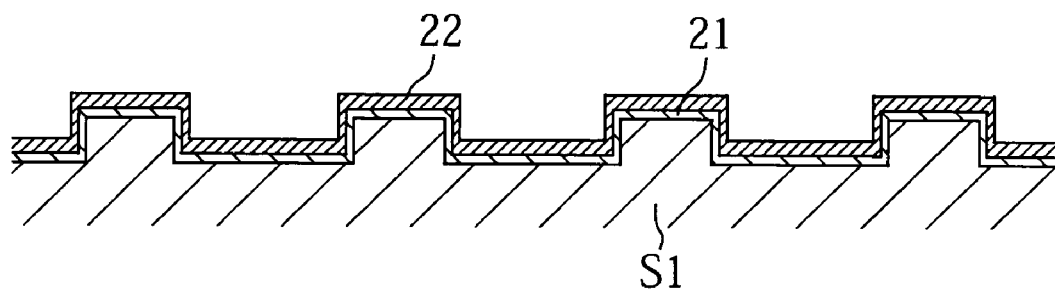
Figure 5A:
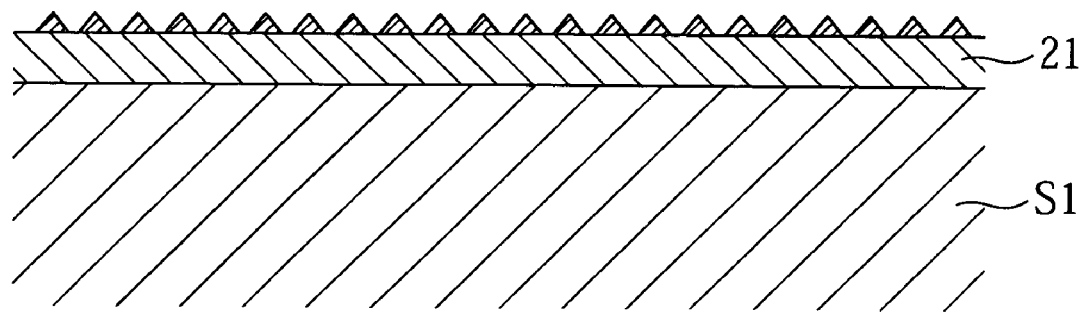
FIGS. 5A and 5B illustrate process steps for making an initial layer.
Figure 5B:
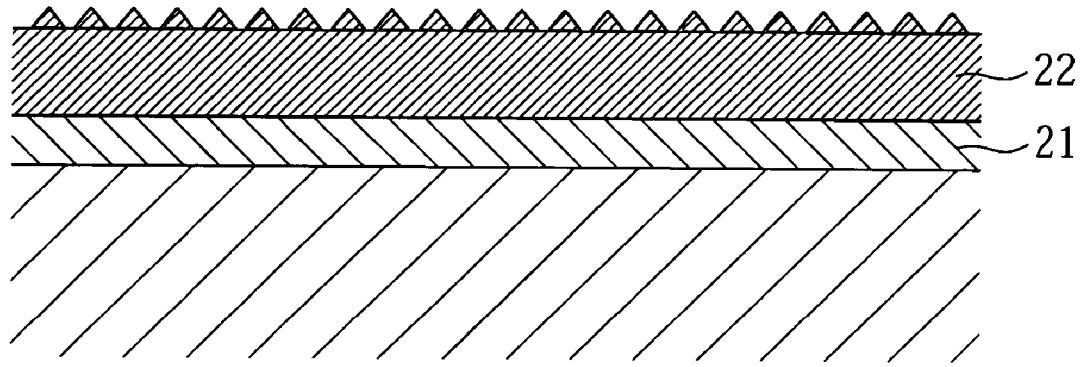

Subsequently, as shown in FIG. 3B, an initial layer 22 is formed on the first foundation layer 21 by sputtering. As shown in FIG. 5A, in the initial stage of material growth in this process step, the material of the initial layer 22 grows in the form of islands on the first foundation layer 21 ("island growth"). This is because the material of the initial layer 22 has a surface tension which is greater than the surface tension of the first foundation layer 21. As a result, the material initially grows in the form of separate islands. As shown in FIG. 5B, the island growth in the initial stage influences the configuration of the surface of the growing material. Thus, when the initial layer 22 is completed by stopping the material growth at a predetermined thickness, the surface of the initial layer 22 on the recording layer side includes minute protrusions and valleys. The degree of minuteness and uniformity of the protrusions and valleys can be adjusted by selecting the materials of the initial layer 22 and first foundation layer 21 and adjusting the film thickness of the initial layer 22.

Figure 3C:
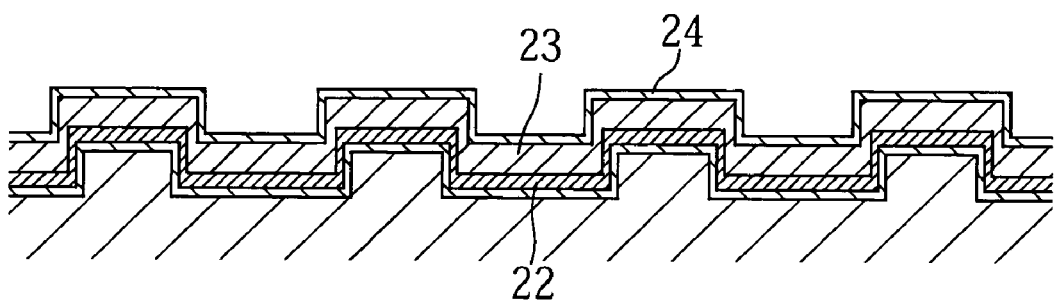

Subsequently, as shown in FIG. 3C, a functional layer 23 and a second foundation layer 24 are successively formed by sputtering. The functional layer 23 is formed by the material growth on the surface of the initial layer 22, which includes the minute protrusions and valleys described above. Therefore, highly minute and uniform protrusions and valleys can be formed on the growing-side surface of the functional layer 23. The degree of minuteness and uniformity is higher than when the functional layer 23 would be formed directly on the substrate S1. The second foundation layer 24 is formed on the growing-side surface of the functional layer 23. Thus, the second foundation layer 24 can also have a growing-side surface formed with highly minute and uniform protrusions and valleys.

Figure 3D:
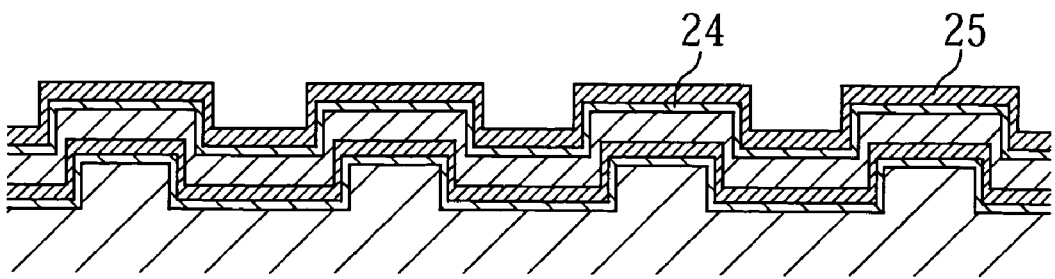
Figure 6A:
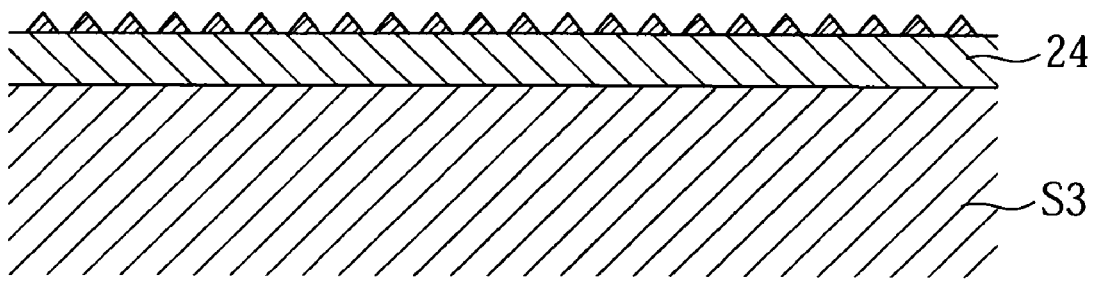
FIGS. 6A and 6B illustrate process steps for making a protrusion/valley controlling layer.
Figure 6B:
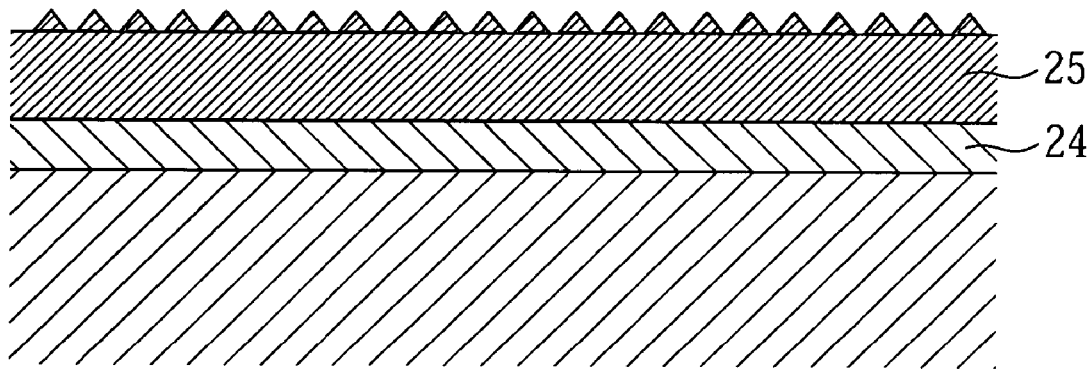

Subsequently, as shown in FIG. 3D, a roughness controlling layer 25 is formed on the second foundation layer 24 by sputtering. As shown in FIG. 6A, in the initial stage of material growth in this process step, the material of the roughness controlling layer 25 develops by island growth on the second foundation layer 24. This is because the material of the roughness controlling layer 25 has a surface tension greater than that of the second foundation layer 24. As shown in FIG. 6B, the island growth in the initial stage influences the configuration of the growing-side surface of the material. By stopping the material growth of the roughness controlling layer 25 at a predetermined thickness, the surface of the layer 25 on the recording layer side can be formed with protrusions and valleys which are more minute and uniform than those of the second foundation layer 24. The degree of minuteness and uniformity can be adjusted by selecting the materials of the roughness controlling layer 25 and second foundation layer 24 and adjusting the film thickness of the roughness controlling layer 25.

Figure 4A:
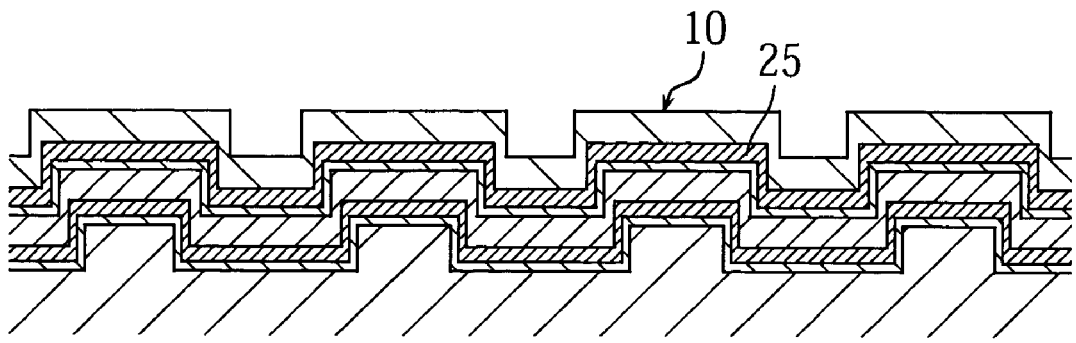
FIGS. 4A-4C illustrate process steps subsequent to the process step shown in FIG. 3D.

Subsequently, as shown in FIG. 4A, a magnetic recording portion 10 is formed. Specifically, a recording layer 11, an intermediate layer 22 and a reproducing layer 13 are formed successively on the roughness controlling layer 25 by sputtering. Due to the protrusions and valleys on the surface of the roughness controlling layer 25, sufficiently large and uniform pinning forces at minute intervals are exerted to the domain walls in the domain structure of the recording layer 11 formed directly on the roughness controlling layer 25. Accordingly, minute and stable pinning units are formed uniformly on the recording layer 11.

Figure 4B:
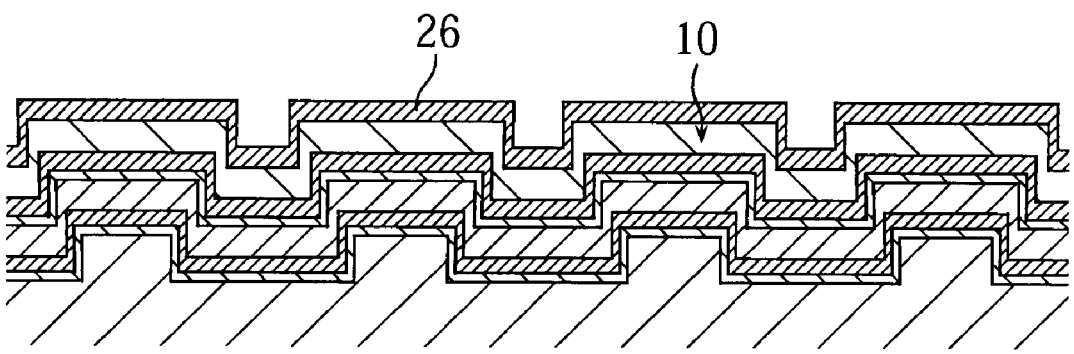
Figure 4C:
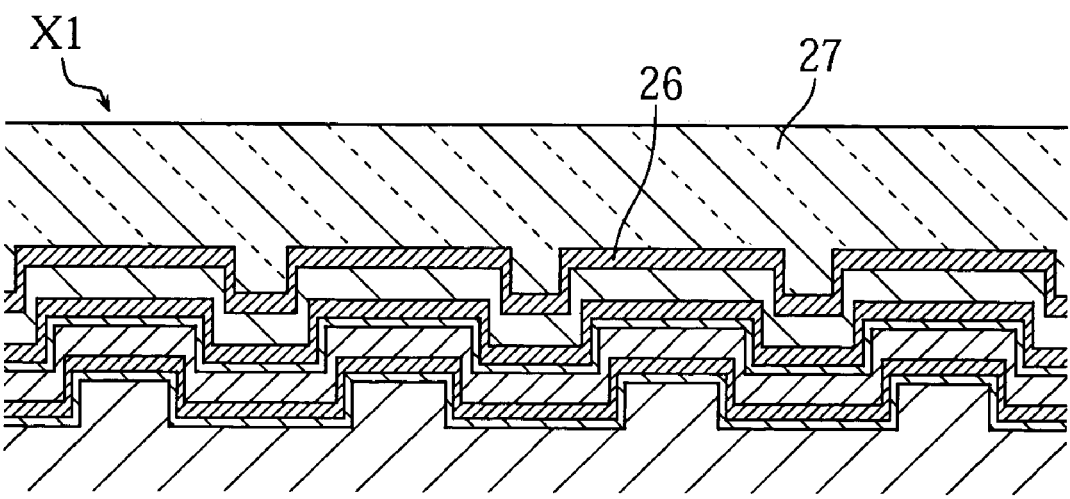

Subsequently, as shown in FIG. 4B, an enhancement layer 26 is formed on the magnetic recording layer 10 (reproducing layer 13) by sputtering. Finally, as shown in FIG. 4C, a protective coat 27 is formed on the enhancement layer 26 by spin coating, which completes the magneto-optical recording medium X1.

As described above, the magneto-optical recording medium X1 includes a laminated structure consisting of the first foundation layer 21 and the initial layer 22, wherein the initial layer 22 is greater in surface tension than the first foundation layer 21. Further, the recording medium X1 includes another laminated structure consisting of the second foundation layer 24 and the roughness controlling layer 25, wherein the controlling layer 25 is greater in surface tension than the second foundation layer 24. The initial layer 22, having a surface formed with minute protrusions and valleys, contributes to the enhancement of the minuteness and uniformity of the protrusions and valleys on the surface of the functional layer 23. Accordingly, the roughness controlling layer 25, though formed on the functional layer 23 indirectly (i.e., with the second foundation layer 24 intervening), can have a recording layer side surface formed uniformly with minutely-pitched protrusions and valleys. The recording layer 11 is laminated directly on the roughness controlling layer 25. Thus, due to the protrusions and valleys of the controlling layer 25, a sufficiently large and uniform pinning forces are exerted at minute pitches to the domain walls of the domain structure of the recording layer 11. As a result, minute and stable pinning units are formed uniformly on the recording layer 11. With this arrangement, the magneto-optical recording medium X1 can provide a high recording resolution and suppress the recording noise (medium noise).

Figures 7, 8:
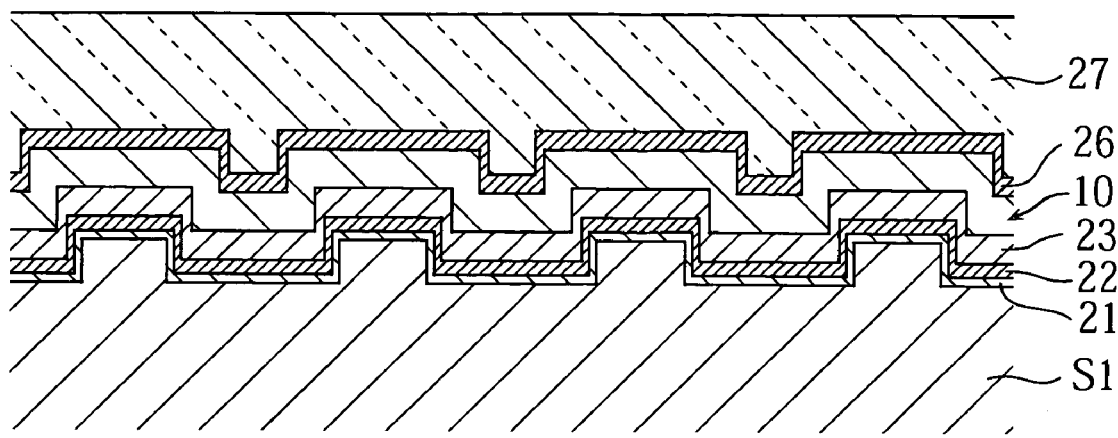
FIG. 7 illustrates a modification of the magneto-optical recording medium according to the first embodiment.
FIG. 8 is a table showing parameter (average particle size, Ra and P-V) with respect to the protrusions/valleys on the uppermost layer surface.

FIG. 7 shows a modified structure of the recoding medium X1 of the first embodiment. As shown in the figure, the second foundation layer 24 and the roughness controlling layer 25 may be dispensed with, when the protrusions and valleys on the surface of the functional layer 23 on the recording layer side are sufficiently minute and uniform. In this case, the magnetic recording portion 10 (the recording layer 11) and the structure provided thereon are formed directly on the functional layer 23.

According to the present invention, the magnetic recording portion 10 (consisting of the recording layer 11, the intermediate layer 12 and the reproducing layer 13) may be replaced with a recording layer having both a recording function and a reproducing function. Also in this case, the recording layer is made of a perpendicular magnetic film made of an amorphous alloy of a rare earth element and a transition metal. Instead of the magnetic recording portion 10, a recording layer having a recording function and a relatively large coercive force may be provided on the roughness controlling layer 25, and a reproducing layer having a reproducing function and a relatively large Kerr rotation angle for reproduction laser beams maybe provided on the recording layer. Also in this case, the recording layer is made of a perpendicular magnetic film made of an amorphous alloy of a rare earth element and a transition metal.

FIG. 8 is a table showing how the surface conditions of a magneto-optical recording medium are affected by the multilayer structure of the medium. To obtain the results, four samples A-D shown in FIGS. 9-12 were made.

As shown in FIG. 9, the sample A includes a laminated structure from the substrate S1 through the roughness controlling layer 25 in the magneto-optical recording medium X1. For preparing the sample A, a SiN film as a first foundation layer was first formed on a flat glass substrate (diameter: 2.5 inches) to a thickness of 2 nm by sputtering. Specifically, the SiN film was formed on the substrate S by reactive sputtering using an Si target, and Ar gas and $N_2$ gas as sputter gas. The sputtering was performed using a rotary cathode type DC-RF magnetron sputtering apparatus (Tradename: C3010-P5, manufactured by ANELVA CORPORATION). (The same apparatus was used also in the subsequent sputtering steps in the sample preparation.) In the sputtering, with the flow ratio of Ar gas and $N_2$ gas set to 2:1 and the sputter gas pressure set to 0.3 Pa, the film growth rate, or deposition rate, was 12 nm/min at the sputtering power of 500 W. Subsequently, a Pt film as an initial layer was formed on the first foundation layer to a thickness of 1 nm by sputtering. In this sputtering, with the sputter gas pressure set to 1.6 Pa, the film was formed using a Pt target at a rate to 3.2 nm/min at the sputtering power of 40 W. Subsequently, an AlSi film as a heat sink layer (functional layer) was formed on the initial layer to a thickness of 30 nm by sputtering. Specifically, the AlSi film was formed by cosputtering using an Al target and an Si target. In the sputtering, with the sputter gas pressure set to 0.6 Pa, the film was formed at a rate of 23 nm/min at the sputtering power of 300 W (for Al target) and 200 W (for Si target) Subsequently, an SiN film as a second foundation layer was formed on the heat sink layer to a thickness of 5 nm by sputtering. Specifically, the SiN film was formed by reactive sputtering using an Si target, and Ar gas and $N_2$ gas as the sputter gas. In the sputtering, with the flow ratio of Ar gas and $N_2$ gas set to 2:1 and the sputter gas pressure set to 0.3 Pa, the film was formed at a rate of 12 nm/min at the sputtering power of 500 W. Subsequently, a Pt film as a roughness controlling layer was formed on the second foundation layer to a thickness of 1 nm by sputtering. In this sputtering, with the sputter gas pressure set to 1.6 Pa, the film was formed using a Pt target at a rate to 3.2 nm/min at the sputtering power of 40 W.

As shown in FIG. 10, the sample B includes a laminated structure from the substrate S1 through the functional layer 23 in the magneto-optical recording medium X1. The sample B was prepared by successively forming a first foundation layer (SiN), an initial layer (Pt) and a heat sink layer (AlSi) on a substrate in a manner similar to the preparation of the sample A.

Figure 11:
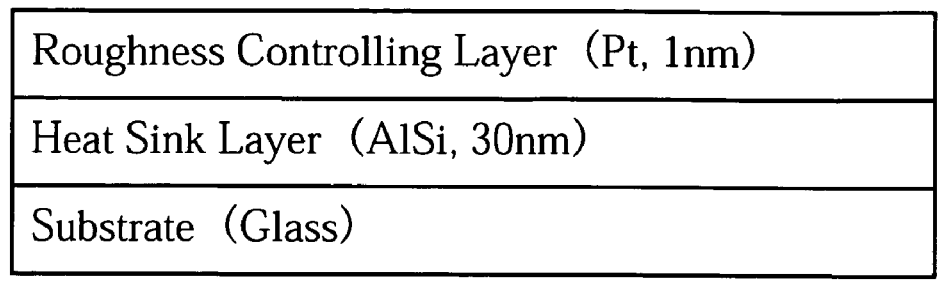
FIG. 11 illustrates the laminated structure of a sample C.

As shown in FIG. 11, the sample C includes a laminated structure including a substrate, a heat sink layer and a roughness controlling layer. For preparing the sample C, an AlSi film as a heat sink layer was formed on a flat glass substrate (diameter: 2.5 inches) to a thickness of 30 nm by sputtering. Specifically, the AlSi film was formed by cosputtering using an Al target and an Si target. In the sputtering, with the sputter gas pressure set to 0.6 Pa, the film was formed at rate of 23 nm/min at a sputtering power of 300 W (for Al target) and 200 W (for Si target). Subsequently, a Pt film as a roughness controlling layer was formed on the heat sink layer to a thickness of 1 nm by sputtering. In the sputtering, with the sputter gas pressure set to 1.6 Pa, the film was formed using a Pt target at a rate to 3.2 nm/min at the sputtering power of 40 W.

Figure 12:
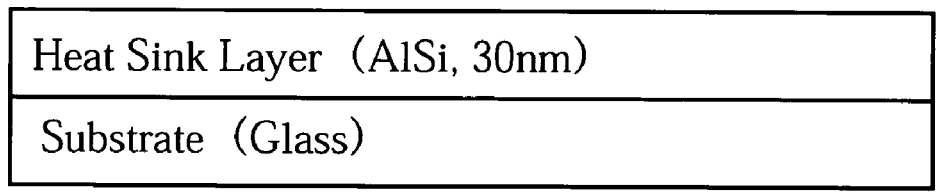
FIG. 12 illustrates the laminated structure of a sample D.

As shown in FIG. 12, the sample D includes a laminated structure consisting of a substrate and a heat sink layer. The sample D was prepared by forming a heat sink layer (AlSi) on a substrate in a manner similar to the preparation of sample C.

The obverse surface of the topmost layer of each of the samples A-D prepared in the above manner was observed using an atomic force microscope (AFM) and was found to include protrusions and valleys. The protrusions and valleys on the topmost layer of the samples A and B were highly uniform, whereas those of the samples C and D were not uniform. With respect to each of the samples A-D, the average diameter of the particles constituting the protrusions and valleys, the surface roughness Ra, and the P–V [the peak(protrusion)–valley height difference] were measured. The results are given in the table of FIG. 8.

The protrusions and valleys on the surface of the heat sink layer of the sample D were not uniform and had a relatively large average particle size (APS) of 34.7 nm. The protrusions and valleys of the sample C were not uniform, though they had an average particle size of 23.5 nm which was smaller than that of the sample D. The samples C and D do not have the structure of the present invention. The protrusions and valleys on the surface of the heat sink layer of the sample B were highly uniform and had an average particle size of 15.2 nm. The protrusions and valleys on the surface of the heat sink layer of the sample A were highly uniform and had an average particle size of 7.6 nm. In this way, the surfaces of the samples A and B, which had a laminated structure of the magneto-optical recording medium X1 of the invention, had protrusions and valleys which are more minute and uniform than those of the samples C and D.

Figure 13:
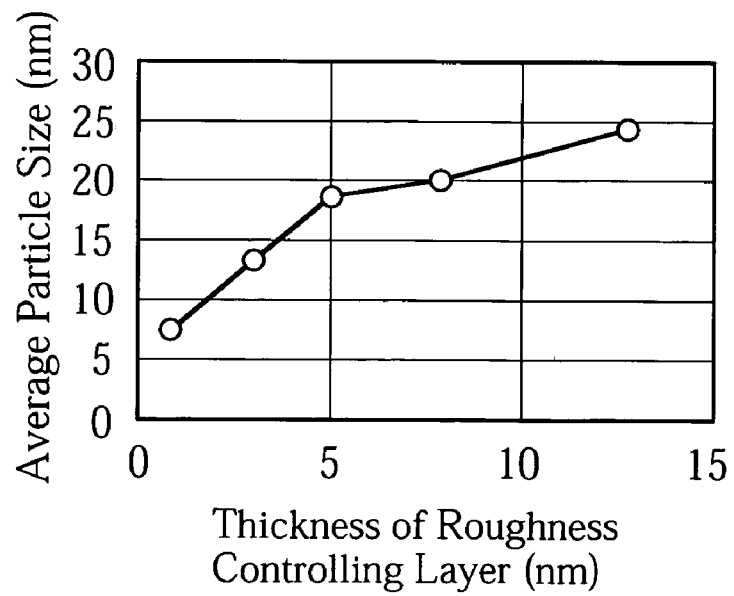
FIG. 13 is a graph showing the film thickness dependency of the average particle size of the protrusion/valley controlling layer.
Figure 14:
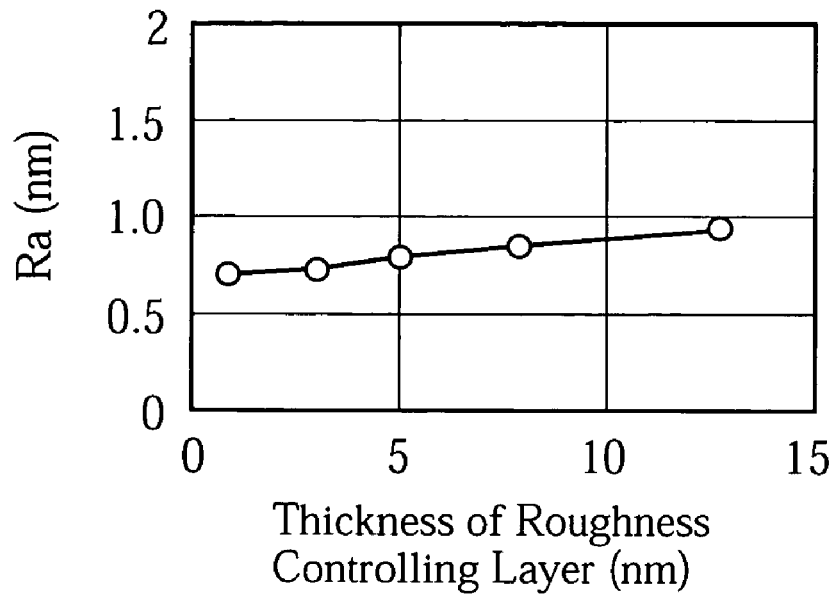
FIG. 14 is a graph showing the film thickness dependency of the Ra of the protrusion/valley controlling layer.
Figure 15:
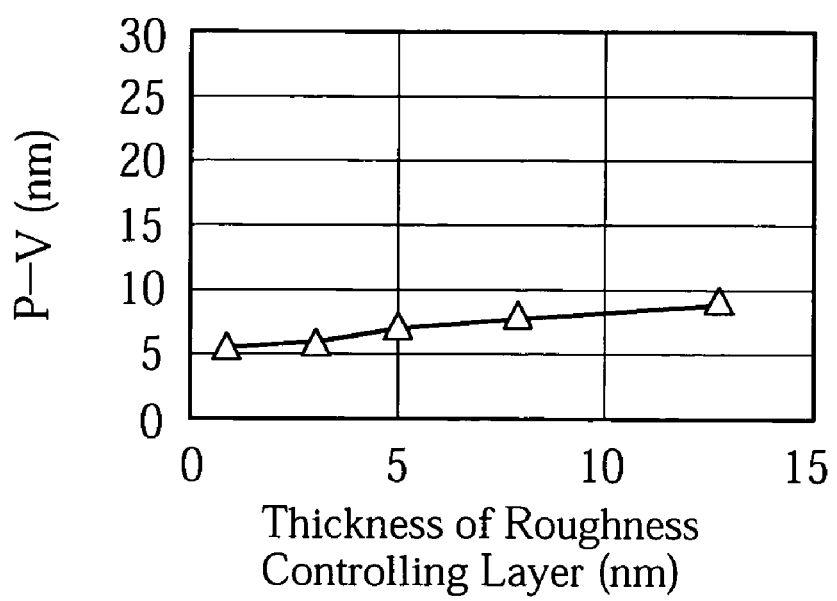
FIG. 15 is a graph showing the film thickness dependency of the P-V of the protrusion/valley controlling layer.

FIGS. 13-15 are graphs showing the film thickness dependency of the parameter for the protrusions and valleys on the surface of the roughness controlling layer 25. Specifically, a plurality of samples which differ from the sample A only in film thickness of the roughness controlling layer were prepared, and the average diameter of the particles constituting the protrusions and valleys, the surface roughness Ra, and the P–V were measured with respect to each of the samples. The samples were prepared in a manner similar to the sample A except for the thickness of the roughness controlling layer.

As will be understood from the graph of FIG. 13, the average particle size increases as the thickness of the roughness controlling layer increases. As will be understood from the graph of FIG. 14, the surface roughness Ra increases as the thickness of the roughness controlling layer increases. Further, as will be understood from the graph of FIG. 15, the P–V increases as the thickness of the roughness controlling layer increases. These results show that the protrusion/valley structure directly under the recording layer 11 of the magneto-optical recording medium X1 can be controlled by controlling the film thickness of the roughness controlling layer 25. By controlling the protrusion/valley structure to be located under the recording layer 11, the pinning force to act on the recording layer 11 and the pinning unit (magnetic cluster) to be formed on the recording layer can be controlled.

Figure 16:
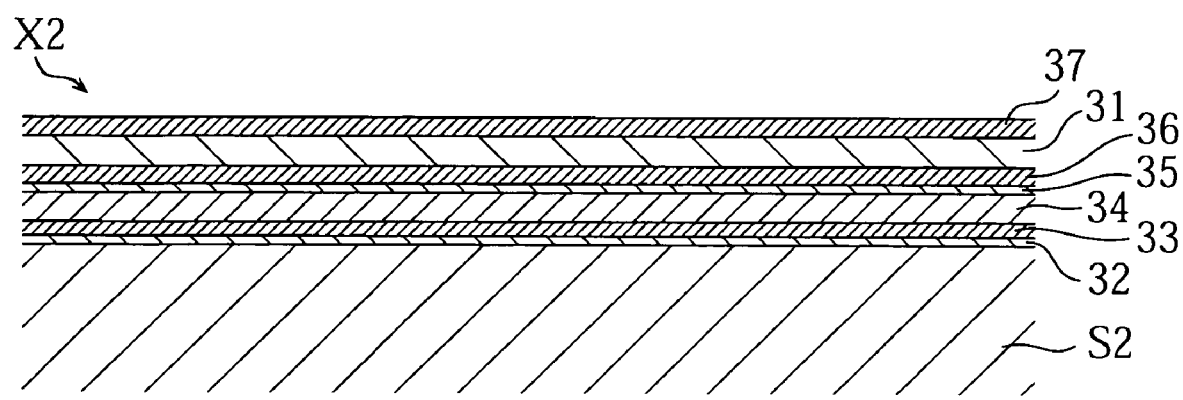
FIG. 16 is a sectional view illustrating part of a magneto-optical recording medium according to a second embodiment of the present invention.
Figure 17:
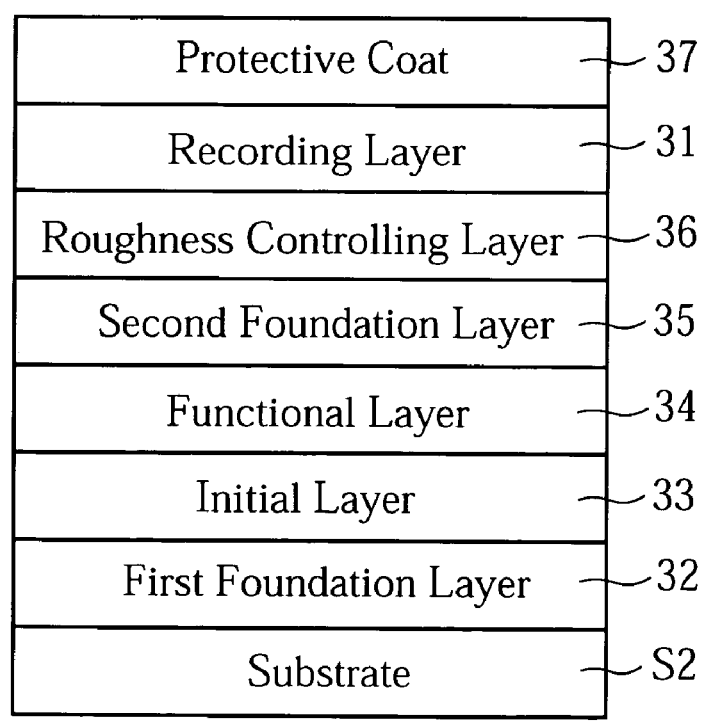
FIG. 17 illustrates the laminated structure of the magneto-optical recording medium shown in FIG. 16.

FIGS. 16 and 17 illustrate a magneto-optical recording medium X2 according to a second embodiment of the present invention. Specifically, FIG. 16 is a sectional view schematically showing part of the magneto-optical recording medium X2, whereas FIG. 17 illustrates the laminated structure of the magneto-optical recording medium X2. The magneto-optical recording medium X2, which is structured as a perpendicular magnetic recording medium, includes a substrate S2, a recording layer 31, a first foundation layer 32, an initial layer 33, a functional layer 34, a second foundation layer 35, a roughness controlling layer 36, and a protective coat 37.

The substrate S2 is a non-magnetic substrate made of aluminum alloy, glass or ceramic material. The substrate S2 has an obverse surface which is flattened by a chemical, physical or mechanical method.

The recording layer 31 is a perpendicular magnetic film made of an amorphous alloy of a rare earth element and a transition metal. In this embodiment, TbFe, TbCo or TbFeCo may be used as the amorphous alloy of a rare earth element and a transition metal. The recording layer 31 may have a thickness of 20-50 nm, for example.

The first foundation layer 32 serves as a base for forming the initial layer 33 thereon and has a surface tension which is smaller than that of the initial layer 33. The first foundation layer 32 may be made of a dielectric material such as SiN, $SiO_2$, $YSiO_2$, $ZnSiO_2$, AlO or AlN, for example. The first foundation layer 32 may have a thickness of 2-10 nm, for example.

The initial layer 33 serves to control the protrusions and valleys on the material-growing-side surface of the functional layer 34 formed thereon. Preferably, the initial layer 33 is made of a material having a surface tension which is greater than that of the first foundation layer 32. Preferably, the difference of surface tension between the initial layer 33 and the first foundation layer 32 is no less than 1000 mN/m. As the material of the initial layer 33, use may be made of a single-element metal selected from the group consisting of Pt, Au, Pd, Ru and Co or an alloy containing a metal selected from the group as long as it has a surface tension greater than that of the first foundation layer 32. The initial layer 33 may have a thickness of 0.1-5 nm, for example. The surface of the initial layer 33 on the functional layer side (i.e. on the recording layer side) has a surface roughness Ra of 0.3-0.6 nm, for example. The protrusions (growing particles) in the protrusion/valley configuration may have an average diameter (average particle size) of 5-10 nm, and a maximum height difference in the protrusion/valley configuration may be 3-5 nm.

The functional layer 34 comprises a soft magnetic film and has in-plane magnetic anisotropy having an easy magnetization axis extending in parallel with the film surface of the layer. It is preferable that the easy magnetization axis of the functional layer 34 extends radially of the disk. The functional layer 34 has a sufficiently small coercive force. For example, the functional layer 34 may be made of permalloy, sendust, Co-based amorphous material or Fe-based amorphous material. The functional layer 34 may have a thickness of 100-300 nm, for example.

The second foundation layer 35 serves as a base for forming the roughness controlling layer 36 thereon and has a surface tension which is smaller than that of the roughness controlling layer 36. Preferably, the surface tension of the second foundation layer 35 is smaller than that of the functional layer 34. The second foundation layer 35 may be made of a dielectric material such as SiN, $SiO_2$, $YSiO_2$, $ZnSiO_2$, AlO or AlN, for example. The second foundation layer 35 may have a thickness of 2-10 nm, for example.

The roughness controlling layer 36 exerts a pinning force to domain walls of the domain structure of the recording layer 31 laminated thereon, thereby controlling the domain structure. The roughness controlling layer 36 is made of a material having a surface tension which is greater than that of the second foundation layer 35. Preferably, the difference of surface tension between the roughness controlling layer 36 and the second foundation layer 35 is no less than 1000 mN/m. As the material of the roughness controlling layer 36, use may be made of a single-element metal selected from the group consisting of Pt, Au, Pd, Ru and Co or an alloy containing a metal selected from the group as long as it has a surface tension greater than that of the second foundation layer 35. The roughness controlling layer 36 may have a thickness of 0.1-5 nm, for example. The surface of the irregular controlling layer 36 on the recording layer side has a surface roughness Ra of 0.5-0.85 nm, for example. For example, the protrusions (growing particles) in the protrusion/valley configuration have an average diameter (average particle size) of 5-20 nm, and a maximum height difference (P–V) in the protrusion/valley configuration may be 3-10 nm.

The protective coat 37 serves to protect the recording layer 31 physically and chemically from the outside. The protective coat 37 may be made of amorphous carbon, diamond-like carbon, SiN or SiC and may have a thickness of 1-10 nm.

To form the magnetic recording medium X2, the first foundation layer 32 through the protective coat 37 are successively formed on the substrate S2 by growing suitable material by sputtering, for example.

In the initial stage of material growth informing the initial layer 33 on the first foundation layer 32 by sputtering, the material of the initial layer 22 develops by island growth on the first foundation layer 32, similarly to the first embodiment (See FIG. 5A). The island growth in the initial stage influences the configuration of the growing-side surface of the material. Therefore, when the initial layer 33 is completed by stopping the material growth at a predetermined thickness, the surface of the initial layer 33 on the recording layer side includes minute protrusions and valleys. The degree of minuteness and uniformity of the protrusions and valleys can be adjusted by selecting the materials of the initial layer 33 and the first foundation layer 32 and adjusting the film thickness of the initial layer 33. The functional layer 34 is formed by the material growth on the surface of the initial layer 33 which includes minute protrusions and valleys. Therefore, although the functional layer 34 is made to have a relatively large thickness, highly minute and uniform protrusions and valleys are formed on the growing-side surface of the functional layer 34. The degree of minuteness and uniformity is higher than when the functional layer 34 is hypothetically formed directly on the substrate S2. Since the second foundation layer 35 is formed on the functional layer 34 having such a structure, the growing-side surface of the second foundation layer 35 also includes highly minute and uniform protrusions and valleys.

In the initial stage of material growth in forming the roughness controlling layer 36 on the second foundation layer 35 by sputtering, the material of the roughness controlling layer 36 develops by island growth on the second foundation layer 35, similarly to the first embodiment (See FIG. 6A). The island growth in the initial stage influences the configuration of the growing-side surface of the material. Therefore, when the roughness controlling layer 36 is completed by stopping the material growth at a predetermined thickness, the surface of the roughness controlling layer 36 on the recording layer side includes protrusions and valleys which are more minute and uniform than those of the second foundation layer 35. The degree of minuteness and uniformity of the protrusions and valleys can be adjusted by selecting the materials of the roughness controlling layer 36 and the second foundation layer 35 and adjusting the film thickness of the roughness controlling layer 36.

Due to the protrusions and valleys on the surface of the roughness controlling layer 36, sufficiently large and uniform pinning forces are exerted at minute pitches to the domain walls in the domain structure of the recording layer 31 formed directly on the roughness controlling layer 36. As a result, minute pinning units are formed uniformly and stably on the recording layer 31.

The magneto-optical recording medium X2 includes a laminated structure consisting of the first foundation layer 32 and the initial layer 33 which is greater in surface tension than the first foundation layer 32, and another laminated structure consisting of the second foundation layer 35 and the roughness controlling layer 36 which is greater in surface tension than the second foundation layer 35. The initial layer 33, having a surface including minute protrusions and valleys, enhances the minuteness and uniformity of the protrusions and valleys on the surface of the functional layer 34 on the recording layer side. Since the roughness controlling layer 36 is formed on the functional layer 34 via the second foundation layer 35, the protrusions and valleys formed on the surface of the roughness controlling layer 36 on the recording layer side are highly minute and uniform. The recording layer 31, which serves to record information, is laminated directly on the roughness controlling layer 36. Therefore, due to the protrusions and valleys on the surface of the roughness controlling layer 36, a sufficiently large and uniform pinning forces are exerted at minute pitches to the domain walls of the domain structure of the recording layer 31. As a result, minute pinning units are formed uniformly and stably on the recording layer 31. Therefore, the magneto-optical recording medium X2 realizes a high recording resolution while suppressing the recording noise (medium noise). Thus, the magneto-optical recording medium X2 is suitable for enhancing the recording density.

EXAMPLE 1

[Preparation of Magneto-Optical Recording Medium]

In this example, a magneto-optical recording medium having the laminated structure shown in FIG. 18 was prepared as a magneto-optical disk of a front illumination type. In the preparation of the magneto-optical recording medium, a polycarbonate substrate (diameter: 120 mm, thickness: 1.2 mm, track pitch: 0.275 nm, groove depth: 35 nm) having a surface with a land/groove structure was prepared. On the substrate, an Si—N film as the first foundation layer was formed to a thickness of 2 nm by sputtering. Specifically, the SiN film was formed by reactive sputtering using an Si target, and Ar gas and $N_2$ gas as sputter gas. The sputtering was performed using a rotational cathode type DC-RF magnetron sputtering apparatus (Tradename: C3010-P5, manufactured by ANELVA CORPORATION). (The same apparatus was used also in the subsequent sputtering steps in the recording medium preparation.) In the sputtering, with the flow ratio of Ar gas and $N_2$ gas set to 2:1 and the sputter gas pressure set to 0.3 Pa, the film was formed at a rate of 12 nm/min at the sputtering power of 500 W.

Subsequently, a Pt film as an initial layer was formed on the first foundation layer to a thickness of 1 nm by sputtering. In this sputtering, with the sputter gas pressure set to 1.6 Pa, the film was formed using a Pt target at a rate of 3.2 nm/min at the sputtering power of 40 W.

Subsequently, an AlSi film as a heat sink layer (functional layer) was formed on the initial layer to a thickness of 30 nm by sputtering. Specifically, the AlSi film was formed by cosputtering using an Al target and an Si target. In the sputtering, with the sputter gas pressure set to 0.6 Pa, the film was formed at a rate of 23 nm/min at the sputtering power of 300 W (for Al target) and 200 W (for Si target).

Subsequently, an SiN film as a second foundation layer was formed on the heat sink layer to a thickness of 5 nm by sputtering. Specifically, the SiN film was formed by reactive sputtering using an Si target, and Ar gas and $N_2$ gas as sputter gas. In the sputtering, with the flow ratio of Ar gas and $N_2$ gas set to 2:1 and the sputter gas pressure set to 0.3 Pa, the film was formed at a rate of 12 nm/min at the sputtering power of 500 W.

Subsequently, a Pt film as a roughness controlling layer was formed on the second foundation layer to a thickness of 1 nm by sputtering. In the sputtering, with the sputter gas pressure set to 1.6 Pa, the film was formed using a Pt target at a rate of 3.2 nm/min at the sputtering power of 40 W.

Subsequently, a $Tb_{22}Fe_{62}CO_{16}$ film as a recording layer was formed on the roughness controlling layer to a thickness of 50 nm by sputtering. Specifically, the $Tb_{22}Fe_{62}CO_{16}$ film was formed by cosputtering using a Tb target and an FeCo target. In the sputtering, with the sputter gas pressure set to 1.5 Pa, the film was formed at a rate of 14 nm/min at the sputtering power of 45 W (for Tb target) and 200 W (for FeCo target).

Subsequently, an SiN film as the enhancement layer was formed on the recording layer to a thickness of 35 nm by sputtering. Specifically, the SiN film was formed by reactive sputtering using an Si target, and Ar gas and $N_2$ gas as sputter gas. In the sputtering, with the flow ratio of Ar gas and $N_2$ gas set to 2:1 and the sputter gas pressure set to 0.3 Pa, the film was formed at a rate of 12 nm/min at the sputtering power of 500 W.

Then, a protective coat was formed on the enhancement layer to a thickness of 15 μm. Specifically, an ultraviolet-curing transparent resin was applied on the dielectric layer by spin coating. The resin film was then hardened by ultraviolet irradiation. In this way, the magneto-optical recording medium of this example was prepared.

[Recorded Magnetic Domain Check]

The magneto-optical recording medium of this example was examined with respect to the recorded domains. Specifically, recording marks having a predetermined mark length were successively formed on an information track of the magneto-optical recording medium (magneto-optical disk) at intervals equal to the mark length. The recording marks were formed by laser pulse magnetic field modulation using a predetermined apparatus provided with an objective lens having a numerical aperture (NA) of 0.85. With this apparatus, a laser beam having a wavelength of 405 nm was applied at a linear velocity (velocity at which the laser spot scans the medium surface) of 5.0 m/S at the recording laser power of 13 mW, while a magnetic field of 200 Oe is applied. After the recording was performed, the protective coat was removed by immersing in a predetermined solution, and then the enhancement layer was removed by reactive ion etching. Thereafter, the recorded domains appearing on the recording layer surface were observed using a magnetic force microscope (Tradname: SPA500, manufactured by SII (Seiko Instruments Inc.)). The observation was performed with respect to the recording marks of different mark length, i.e. 70 nm, 65 nm, 60 nm, 55 nm and 50 nm. As a result, it was found that the domains were properly separated from each other when the mark length was 70 nm, 65 nm, 60 nm or 55 nm.

COMPARATIVE EXAMPLE 1

[Preparation of Magneto-Optical Recording Medium]

In this comparative example, a magneto-optical recording medium having the laminated structure shown in FIG. 19 was prepared as a magneto-optical disk of a front illumination type. In the preparation of the comparative magneto-optical recording medium, a polycarbonate substrate (diameter: 120 mm, thickness: 1.2 mm, track pitch: 0.275 nm, groove depth: 35 nm) having a surface with a land/groove structure was prepared. On the substrate, an AlSi film as the heat sink layer was formed to a thickness of 30 nm by sputtering. Specifically, the AlSi film was formed by cosputtering using an Al target and an Si target. In the sputtering, with the sputter gas pressure set to 0.6 Pa, the film was formed at a rate of 23 nm/min at the sputtering power of 300 W (for Al target) and 200 W (for Si target).

Subsequently, a Pt film as a roughness controlling layer was formed on the heat sink layer to a thickness of 1 nm by sputtering. In this sputtering, with the sputter gas pressure set to 1.6 Pa, the film was formed using a Pt target at a rate of 3.2 nm/min at the sputtering power of 40 W.

Then, the recording layer, the enhancement layer and the protective coat were formed on the roughness controlling layer in a manner similar to the formation of the recording layer, the enhancement layer and the protective coat on the roughness controlling layer in Example 1.

[Recorded Magnetic Domain Check]

The magneto-optical recording medium of this comparative example was examined with respect to the recorded domains. Specifically, recording marks having a predetermined mark length were successively formed on an information track of the magneto-optical recording medium (magneto-optical disk) at intervals equal to the mark length. The recording marks were formed by laser pulse magnetic field modulation using a predetermined apparatus provided with an objective lens having a numerical aperture (NA) of 0.85. With this apparatus, a laser beam having a wavelength of 405 nm was applied at a linear velocity of 5.0 m/S at the recording laser power of 13 mW, while a magnetic field of 200 Oe is applied. Thereafter, the recorded domains were observed using a magnetic force microscope (Tradname: SPA500, manufactured by SII). The observation was performed with respect to the recording marks of different mark length, i.e. 150 nm, 100 nm and 80 nm. As a result, it was confirmed that the domains were properly separated from each other when the mark length was 150 nm or 100 nm. When the mark length was 80 nm, the domains were not separated properly.

EXAMPLE 2

[Preparation of Magneto-Optical Recording Medium]

In this example, a magneto-optical recording medium having the laminated structure shown in FIG. 20 was prepared as a magneto-optical disk of a front illumination type. The magneto-optical recording medium of this example includes a magnetic recording portion comprising a recording layer, an intermediate layer and a reproducing layer. The reproducing layer has such a structure that expansion of magnetic domains and displacement of domain walls occur during the reproducing process.

In the preparation of the magneto-optical recording medium, a first foundation layer, an initial layer, a heat sink layer, a second foundation layer and a roughness controlling layer were successively formed on a polycarbonate substrate (diameter: 120 mm, thickness 1.2 mm, track pitch: 0.275 nm, groove depth: 35 nm) similarly to Example 1.

Subsequently, a $Tb_{22}Fe_{62}Co_{16}$ film as a recording layer was formed on the roughness controlling layer to a thickness of 70 nm by sputtering. In the sputtering, with the sputter gas pressure set to 1.5 Pa, the film was performed using a Tb target and an FeCo target at a rate set to 14 nm/min at the sputtering power of 45 W (for Tb target) and 200 W (for FeCo target). Subsequently, a $Tb_{22}Fe_{78}$ film as an intermediate layer was formed on the recording layer to a thickness of 15 nm by sputtering. In this sputtering, with the sputter gas pressure set to 2.5 Pa, the film was formed using a Tb target and an Fe target at a rate of 13 nm/min at the sputtering power of 76 W (for Tb target) and 300 W (for Fe target). Subsequently, a $Gd_{27}Fe_{65}Co_8$ film as a reproducing layer was formed on the intermediate layer to a thickness of 20 nm by sputtering. In the sputtering, with the sputter gas pressure set to 0.3 Pa, the film was formed using a Gd target and an FeCo target at a rate of 14 nm/min at the sputtering power of 100 W (for Gd target) and 250 W (for FeCo target). In this way, the magnetic recording portion consisting of the recording layer, the intermediate layer, the reproducing layer was formed.

Subsequently, an enhancement layer and a protective coat were formed on the reproducing layer in a manner similar to Example 1. In this way, the magneto-optical recording medium of this example was prepared.

[Record Reproduction Performance]

The magneto-optical recording medium of this example was examined with respect to the record reproduction performance. Specifically, recording marks having a predetermined mark length were successively formed on an information track of the magneto-optical recording medium (magneto-optical disk) at intervals equal to the mark length. The recording marks were formed by laser pulse magnetic field modulation using a predetermined apparatus provided with an objective lens having a numerical aperture (NA) of 0.85. With this apparatus, a laser beam having a wavelength of 405 nm was applied at a linear velocity (velocity at which the laser spot scans the medium surface) of 4.0 m/S at the recording laser power of 11 mW, while a magnetic field of 200 Oe is applied. Then, the magneto-optical recording medium was reproduced, and the CNR (dB) of the reproduction signals was measured. The reproducing was performed using the same apparatus at a linear velocity of 4.0 m/s at the reproduction laser power of 2.0 mW. The output level of the reproduction signals was measured using a spectral analyzer.

The CNR (dB) of reproduction signals were measured with respect to the recording marks of various mark length. The results are indicated by the line E2 in the graph of FIG. 22, in which the abscissa indicates the mark length (nm) of the recording marks, whereas the ordinate indicates the CNR (dB). Further, the reproduction omission ratio was checked with respect to each mark length. The results are indicated by the line E2' in the graph of FIG. 23, in which the abscissa indicates the mark length (nm), whereas the ordinate indicates the ratio of the reproduction omission, or reproduction failure, expressed in %. The omission ratio refers to the number of non-reproduced signals divided by the total number of signals supposed to be recorded. The reproduction omission is caused by the failure of stable forming of an appropriate magnetic domain or a recording mark in the recording process.

COMPARATIVE EXAMPLE 2

[Preparation of Magneto-Optical Recording Medium]

In this comparative example, a magneto-optical recording medium having the laminated structure shown in FIG. 20 was prepared as a magneto-optical disk of a front illumination type. The magneto-optical recording medium of this comparative example includes a laminated structure comprising a recording layer, an intermediate layer and a reproducing layer. The reproducing layer has such a structure that expansion of magnetic domains and displacement of domain walls occur during the reproducing process.

In the preparation of the magneto-optical recording medium, a heat sink layer and a roughness controlling layer were successively formed on a polycarbonate substrate (diameter: 120 mm, thickness: 1.2 mm, track pitch: 0.275 nm, groove depth: 35 nm) in a manner similar to Comparative Example 1. Thereafter, a recording layer, an intermediate layer, a reproducing layer, an enhancement layer and a protective coat were successively formed in a manner similar to Example 2.

[Record Reproduction Performance]

In a manner similar to Example 2, the CNR (dB) of reproduction signals was measured with respect to recording marks of various mark length. The results are indicated by the line C2 in the graph of FIG. 22. Further, the reproduction omission ratio was checked with respect to each mark length in a manner similar to Example 2. The results are indicated by the line C2' in the graph of FIG. 23.

Evaluation:

[As to Recorded Magnetic Domains in Example 1 and Comparative Example 1]

As noted above, in the recording medium of Example 1, the domains were properly separated from each other when the mark length was 70 nm, 65 nm, 60 nm or 55 nm. However, in the recording medium of Comparative Example 1, the domains were not separated properly when the mark length was 80 nm, although the separation was confirmed when the mark length was 150 nm or 100 nm. From these results, it is concluded that the magneto-optical recording medium of Example 1 has a higher recording resolution. Conceivably, this is because the presence of the initial layer makes the protrusions and valleys of the roughness controlling layer directly below the recording layer more minute and uniform than those of the roughness controlling layer of the magneto-optical recording medium of Comparative Example 1.

[As to Record Reproduction Performance in Example 2 and Comparative Example 2]

Figure 22:
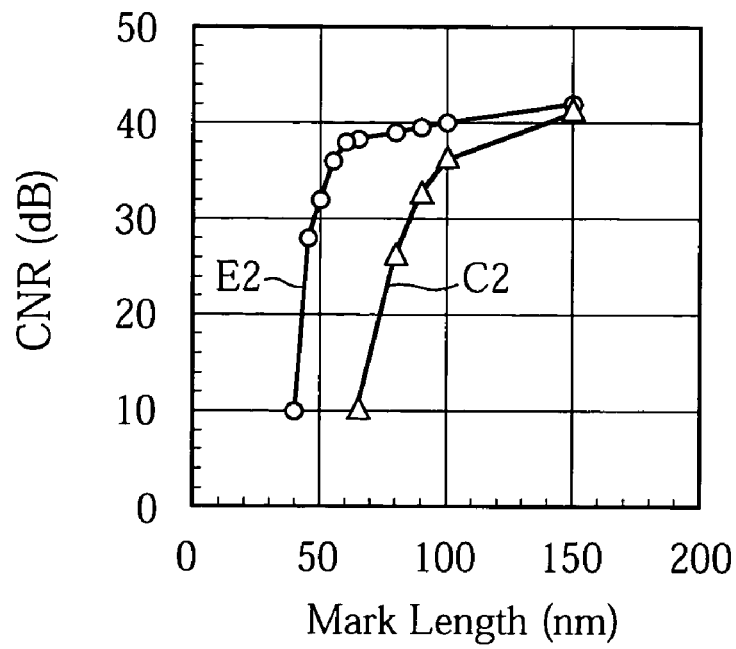
FIG. 22 is a graph showing the mark length dependency of the CNR of magneto-optical recording medium of Example 2 and Comparative Example 2.
Figure 23:
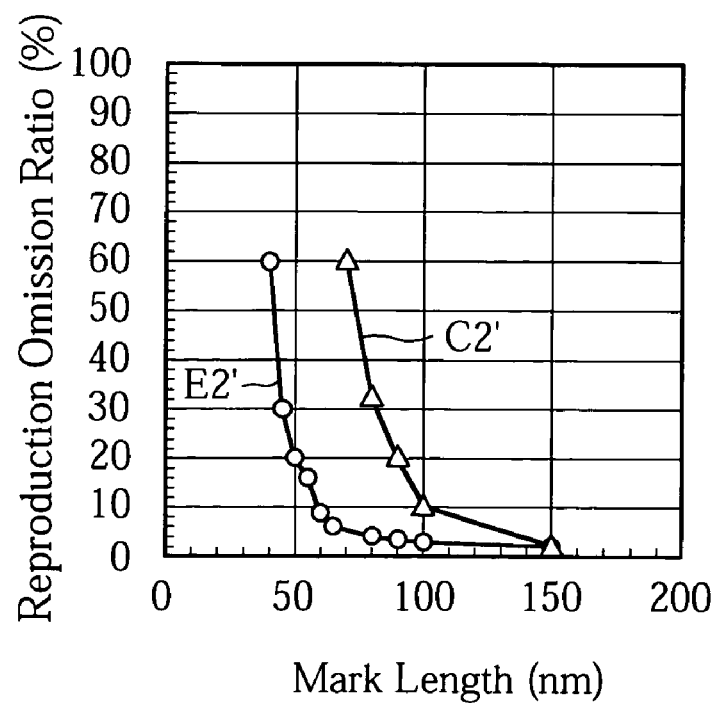
FIG. 23 is a graph showing the mark length dependency of the reproduction omission ratio for the magneto-optical recording medium of Example 2 and Comparative Example 2.

From the graph of FIG. 22, it is observed that the magneto-optical recording medium of Example 2 has a higher recording resolution than that of Comparative Example 2. For example, when the mark length is 80 nm, the CNR of the magneto-optical recording medium of Example 2 is about 12 dB higher than that of Comparative Example 2. From the graph of FIG. 23, it is observed that the reproduction omission ratio for the magneto-optical recording medium of Example 2 is lower than that of Comparative Example 2. Specifically, in the magneto-optical recording medium of Comparative Example 2, the reproduction omission ratio exceeds 20% when the mark length is shorter than about 90 nm. On the other hand, in the magneto-optical recording medium of Example 2, the omission ratio is suppressed to no more than about 10% when the mark length is longer than about 60 nm. The low omission ratio means that recording marks are formed stably. From the graph of FIG. 23, therefore, it is observed that smaller magnetic domains (recording marks) can be stably formed in the magneto-optical recording medium of Example 2 than in the magneto-optical recording medium of Comparative Example 2.

The invention claimed is:

1. A recording medium with a laminated structure, the medium comprising:
    a substrate;
    a recording layer provided with perpendicular magnetic anisotropy for recording of information;
    a first foundation layer located between the substrate and the recording layer, the first foundation layer being made of a material selected from the group consisting of SiN, $SiO_2$, $YSiO_2$, $ZnSiO_2$, AlO and AlN;
    an initial layer which is greater in surface tension than the first foundation layer and held in contact with a recoding-layer-side surface of the foundation layer, the initial layer being made of a material selected from the group consisting of Pt, Au, Pd, Ru, Co and alloys thereof;
    a functional layer held in contact with a recoding-layer-side surface of the initial layer,
    a second foundation layer held in contact with a recoding-layer-side surface of the functional layer, the second foundation layer being made of a material selected from the group consisting of SiN, $SiO_2$, $YSiO_2$, $ZnSiO_2$, AlO and AlN; and
    a roughness controlling layer which is greater in surface tension than the second foundation layer and interposed between the second foundation layer and the recording layer, the roughness controlling layer being made of a material selected from the group consisting of Pt, Au, Pd, Ru, Co and alloys thereof;
    wherein the second foundation layer is spaced from the first foundation layer at least by as much as a combined thickness of the initial layer and the functional layer.

2. The recording medium according to claim 1, wherein the functional layer comprises one of a heat sink layer, a non-magnetic layer, a recording magnetic field reducing layer and a soft magnetic layer.

3. The recording medium according to claim 1, wherein the functional layer has a thickness of no less than 20 nm.

4. The recording medium according to claim 1, wherein the second foundation layer is smaller in surface tension than the functional layer.

5. The recording medium according to claim 1, wherein the roughness controlling layer includes a recording-layer-side surface having a surface roughness Ra of 0.5-0.85 nm.

6. The recording medium according to claim 1, wherein the protrusion/valley controlling layer has a recording-layer-side surface formed with protrusions and valleys, and wherein an average diameter of the protrusions is 5-20 nm.

7. The recording medium according to claim 1, wherein the protrusion/valley controlling layer has a recording-layer-side surface formed with protrusions and valleys, the protrusions and valleys having a maximum height difference of 3-10 nm.

8. The recording medium according to claim 1, wherein the recording medium is a magneto-optical recording medium having a multi-layer structure.

* * * * *

UNITED STATES PATENT AND TRADEMARK OFFICE
CERTIFICATE OF CORRECTION

PATENT NO. : 7,521,135 B2
APPLICATION NO. : 10/808236
DATED : April 21, 2009
INVENTOR(S) : Takeshi Morikawa It is certified that error appears in the above-identified patent and that said Letters Patent is hereby corrected as shown below:

<u>In the Claims</u>:

Col. 20, line 59, delete "protrusion/valley" and insert --roughness controlling--.

Signed and Sealed this

Twenty-second Day of December, 2009

David J. Kappos
*Director of the United States Patent and Trademark Office*